Nov. 10, 1970  W. R. HOGG  3,539,919
METHOD FOR MAKING GLASS APERTURE TUBE AND PRODUCT
PRODUCED THEREBY
Filed April 25, 1968  4 Sheets-Sheet 2

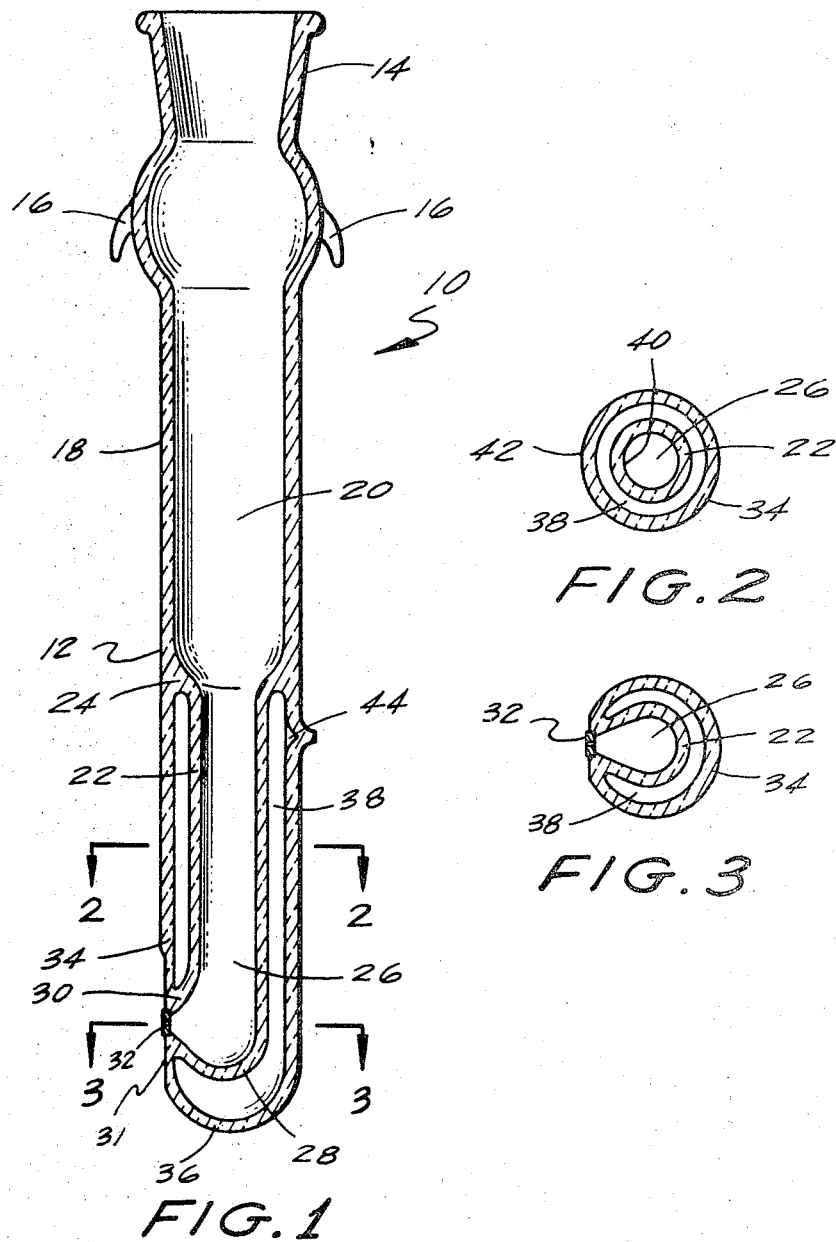

INVENTOR.
WALTER R. HOGG
BY
ATTORNEYS

INVENTOR.
WALTER R. HOGG
BY Silverman + Cass

ATTORNEYS

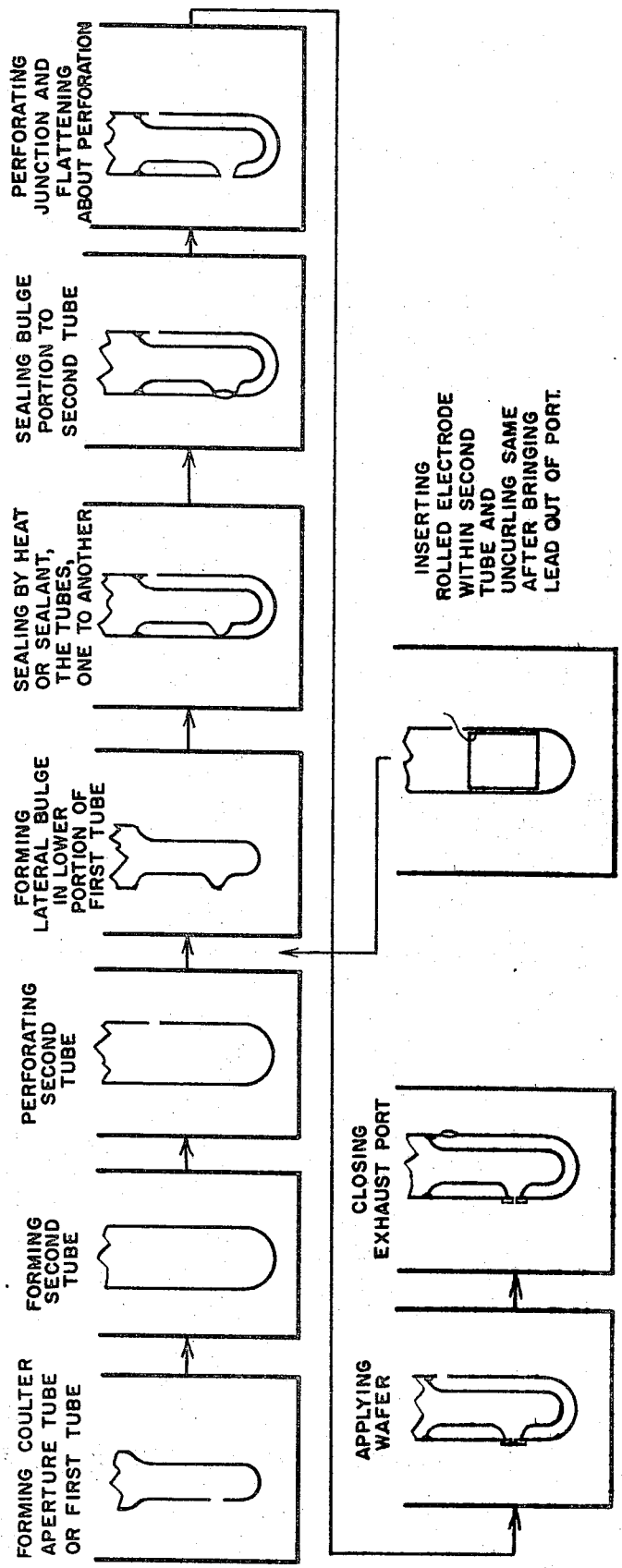

United States Patent Office 3,539,919
Patented Nov. 10, 1970

3,539,919
METHOD FOR MAKING GLASS APERTURE TUBE AND PRODUCT PRODUCED THEREBY
Walter R. Hogg, Hialeah, Fla., assignor to Coulter Electronics, Inc., Hialeah, Fla., a corporation of Illinois
Continuation-in-part of application Ser. No. 601,172, Dec. 12, 1966. This application Apr. 25, 1968, Ser. No. 724,181
Int. Cl. G01n 27/00; C03b 23/24
U.S. Cl. 324—71
15 Claims

ABSTRACT OF THE DISCLOSURE

An aperture tube for use with a Coulter particle analyzing apparatus and having a chamber defining a low-dielectric constant layer positioned between an outer tube wall having a closed bottom and carrying an aperture means and between an inner tube wall carrying an inner body of liquid electrolyte and said layer being communicatively isolated from the interior of said inner tube whereby shunt capacitance paths between said inner body and an outer body of liquid electrolyte as used with the Coulter apparatus are materially reduced and wherein a guard electrode is provided along a substantial portion of said chamber and isolated from the inner body of liquid electrolyte contained in the inner tube wall, the guard electrode potential being maintained the same as that of the outer liquid electrolyte body, and the capacitance between the bodies of liquid electrolyte thereby rendered independent of changing outer liquid level.

CROSS REFERENCE TO RELATED APPLICATION

This is a continuation-in-part of application Ser. No. 601,172 having the identical title, filed by the applicant Dec. 12, 1966 and now abandoned.

BACKGROUND OF THE INVENTION

Field of the invention

The invention herein relates generally to so-called aperture tubes for Coulter electronic particle counting apparatus of the type utilizing the principles of U.S. Pat. 2,656,-508, but more particularly is concerned with an aperture tube in which the capacitance between the inner and outer electrolyte contacting surfaces is substantially reduced when compared with the capacitance of known apparatus. Additionally, the capacitance is rendered constant by means of a guard electrode, notwithstanding changes in the level of electrolyte in the vessel in which the aperture tube is immersed.

Most commercial Coulter electronic particle analyzing apparatuses utilize aperture tubes of glass into one wall of which there is installed a wafer of sapphire or ruby having a minute orifice. The aperture tube is immersed well over the aperture in a body of electrolyte which has particles suspended therein. The suspension of particles in electrolyte usually represents a concentration of some known degree, and the particles are to be counted, sized and generally studied. The interior of the aperture tube has a second body of electrolyte therein as a part of an enclosed manometer-syphon system which in operation serves to cause the flow of suspension through the minute orifice (which is called an aperture hereinafter). This aperture is the only physical path for electrolyte flow between the interior of the aperture tube and the outer body of fluid, the latter normally being carried in a glass beaker or other vessel.

In addition to the flow of liquid, an electric current source is connected to electrodes which are also immersed in the respective bodies of fluid and an electric current flows simultaneously through the aperture along with the passage of liquid. A detector including an amplifier input, in many cases having high impedance, is connected across the electrodes also, so that any electrical changes occurring in the aperture by reason of the passage of particles therethrough will produce signals in the detector for counting, sizing, etc. The signals produced are quite closely proportional, respectively, to the mass volume of consecutive particles passing through the aperture. This phenomenon is known as the Coulter principle.

The above described structure assumes that there will be electric current only in the aperture, but it has been found that even in the case of aperture current sources of direct current, there will be minute shunt paths between the bodies of fluid through the glass wall of the aperture tube in the vicinity of the aperture. The electrical equivalent of the aperture is a high ohmage impedance between the two bodies of fluid, and the shunt current paths are parallel with this impedance, and can be significant, since the detector responds to changes in the impedance of the aperture notwithstanding the principal aperture current is direct current. Alternating current sources may also be used in Coulter apparatus, and in such cases, the shunt paths become even more important, as will be seen.

Shunt current paths around the aperture through the glass or other materials from which the aperture tube may be made give rise to noise and decreased sensitivity. The noise produces spurious signals or requires the detector to be adjusted to reject all signals of amplitudes lost in the noise. In many studies of minute particles, this decreases the usefulness of the apparatus. Sensitivity and bandwidth effectively suffer. These problems become more pronounced where the aperture is very small compared to the usual ones, and where the electrolyte has low conductivity.

Another problem that arises, relates to the change in capacitance due to change in level of the liquid body in which the aperture tube is immersed.

It becomes apparent that if the capacitance between the two bodies of liquid has been decreased a substantial amount, and there is a material change in the volume of the outer body, there may also be a change in the capacitance. It would be best that the capacitance remain constant in any event, but this may not obtain if the level of the liquid in the beaker, that is, of the outer body of electrolyte, changes radically. While not normally of significance in the case of Coulter apparatus where the current source provides a direct current in the aperture, it is important in those cases where the aperture current is A.C., and the higher the frequency, obviously the more significant this change in capacitance. Thus, for example, assuming that the aperture of a given apparatus has been carefully tuned, that is, the capacitance has been balanced by inductance to make the phase shift due to the aperture in the resulting signals as low as possible, a radical change in the liquid level in the beaker will upset this tuning.

The principal objects of the invention are concerned with the solution of these problems, it being desired to provide a simplified aperture tube structure which will substantially reduce the shunt capacitance across the glass of the aperture tube in the vicinity of the aperture; and also to provide structure which will keep the shunt capacitance substantially constant, notwithstanding that the liquid level in one or the other of the two vessels changes radically.

The prior art

Prior aperture tubes were made of glass, inasmuch as glass is easy to keep clean, transparent, relatively durable and easy to shape. They had single walls. The shunt capacitance between the bodies of liquid on the inside and outside of the glass tubes exists between the outer and inner electrolyte-contacting surfaces. The dielectric constant and thickness of the intervening glass will control the capacitance. Glass has a dielectric constant in the vicinity of 3 or 4. Any attempt to decrease the shunt capacitance by increasing the wall thickness of an aperture tube is impractical. This impracticability is compounded when one considers the mechanical problems of installing a wafer in an unduly thick glass wall. These wafers have the minute apertures formed therein.

The construction and operation of the Coulter electronic particle analyzing device are disclosed in U.S. Pat. 2,656,508, issued Oct. 20, 1953 to Wallace H. Coulter.

The construction and operation of the manometer-syphon system above referred to are disclosed in U.S. Pat. 2,869,078 issued Jan. 13, 1959 to Wallace H. Coulter and Joseph R. Coulter, Jr.

The aperture tube having a corundum wafer is disclosed in U.S. Pat. No. 2,985,830 issued May 23, 1961 to Wallace H. Coulter and others.

All of the above patents as well as the invention herein, have been assigned to Coulter Electronics, Inc. of Hialeah, Fla.

Aperture tubes of the general construction described in the last-mentioned of the above patents have been sold in quantities throughout the world, and for the most part, they have been made of glass, some with graded seals, having aperture wafers of sapphire and ruby. Early aperture tubes had wafers cemented in place.

SUMMARY OF THE INVENTION

The reduction of the capacitance between the inner and outer electrolyte-contacting surfaces of an aperture tube is achieved by separating the surfaces by means of a layer of low dielectric constant. An easily provided layer would be a gas, such as for example air. This can be done in the most practical way by having a tube within a tube, that is—constructing the lower end of the aperture tube with a double wall thereby providing a gas chamber between the walls. Since the dielectric constant of most gases, including air, is in the vicinity of unity, a layer of air equal in thickness to a similar layer of glass would have the same effect upon shunt capacitance that would result from increasing the wall thickness of a glass aperture tube four or five times.

The net effect of such construction is to provide an aperture tube in which the lower end of the tube is made up of two glass walls with an interposed sandwich material having very low dielectric constant.

Several arrangements for providing the layer of air or gas are proposed in the specification.

With respect to the structure for keeping the shunt capacitance constant, this is accomplished by providing a guard electrode surrounding the gas layer, and keeping this electrode at the same potential as the electrode which is immersed within the outer liquid body. Modified forms have the guard electrode also performing the function of the normally used immersion electrode in the outer body of suspension liquid. Accordingly, as the level of liquid changes, there is no change of the potential of the guard electrode, and hence no change in the shunt capacitance.

Several variations of both of the above are disclosed.

BRIEF DESCRIPTION OF THE DRAWINGS

FIG. 1 is a median sectional view through an aperture tube constructed in accordance with the invention, illustrating one embodiment whose intended purpose is to reduce shunt capacitance through the tube wall when connected into the circuit of an electronic particle analyzing apparatus.

FIG. 2 is a transverse sectional view along the line 2—2 of FIG. 1 and in the indicated direction.

FIG. 3 is a transverse sectional view along the line 3—3 of FIG. 1 and in the indicated direction.

FIG. 14 is a diagrammatic flow diagram illustrating the steps in a process for manufacturing the aperture tube according to the invention.

DESCRIPTION OF THE PREFERRED EMBODIMENTS

Figures 4, 5, 6:
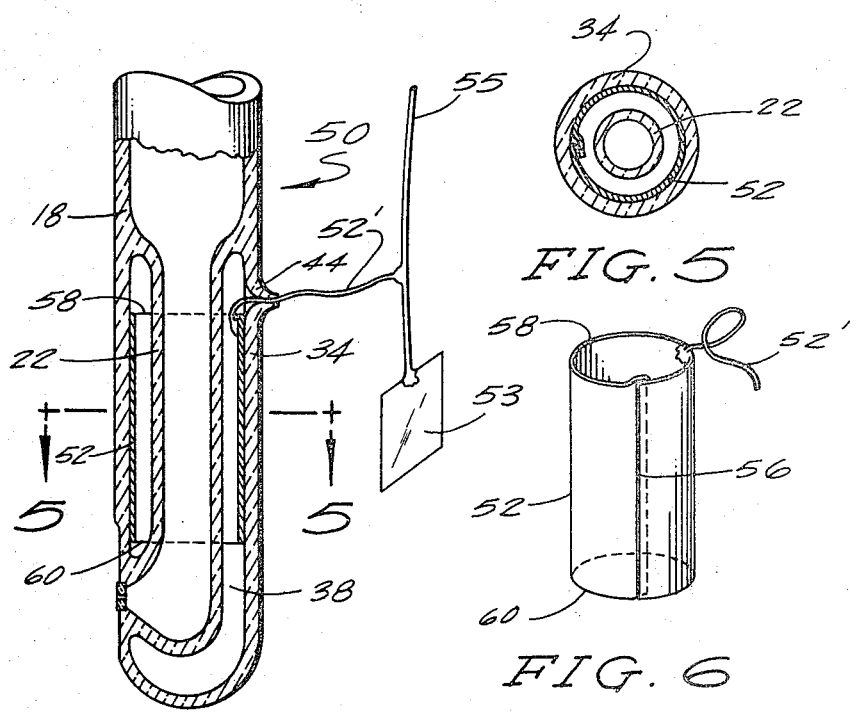
FIG. 4 is a fragmentary median sectional view of another form of the invention similar to that of FIG. 1 but in this case a conducting member has been added to keep the shunt capacitance constant when properly connected in the analyzing apparatus circuit.
FIG. 5 is a transverse sectional view along the line 5—5 of FIG. 4 and in the indicated direction.
FIG. 6 is a perspective view of the conductive guard electrode.

As stated above, the invention comprises forming the aperture tube with a double wall or some other structure providing a layer of material having a low dielectric constant between the inner and outer electrolyte-contacting surfaces of the aperture tube, and in the cases where the shunt capacitance is to be kept constant—providing a guard electrode about the layer of material, in a manner to be described.

In FIG. 1, an aperture tube 10 is illustrated in a sectional view. The upper end of the tube above the point 12 is conventional. There is an internally taper-ground mouth 14 to connect the tube into a fluid system; horns 16 to secure the tube in its connection; an upper tubular body portion 18 which is adapted to contain a portion of the interior body of fluid electrolyte on its interior in the upper fluid chamber 20. At the point 12, the tube 10 has an interior lower tubular body portion 22: extending downwardly; of smaller diameter than the portion 18 and connected thereto by the tapered neck 24; adapted to carry another portion of the interior body or fluid electrolyte on its interior in the lower fluid chamber 26.

At its bottom end the chamber 26 is closed off at 28 and is provided with a lateral bulge 30 having its outer surface 31 flattened as by grinding, there being a perforated wafer 32 set into the bulge 30 with its aperture arranged normal to the axis of the tube 10. The wafer is preferably of corundum, and the method of setting into the wall is described in U.S. Pat. 3,122,431.

The conventional Coulter aperture tube includes all of the components described thus far, except that there is no bulge as at 30. The bulge provides a vertical wall of the reduced diameter lower tubular body portion spaced radially outward from the chamber 26 for a purpose to be described.

The lower end of the tube 10 below the point 12 is provided with an outer glass envelope 34 whose diameter is about the same as that of the upper tubular body portion 18. This envelope is sealed to the portion 18 at 12, sealed to the bulge 30 as shown, so that there is only one wall thickness at 31, and closed off at its bottom end 36. In this manner a sealed cylindrical chamber 38 is formed sandwiched between the envelope 34 and the lower tubular body portion 22 which contains a gas having a lower dielectric constant than glass, the material from which the tube walls are made. By means of the lateral bulge 30, the envelope 34 does not interfere with the normal operation of the aperture tube 10 when it is immersed in a vessel containing fluid electrolyte and particles are drawn through the aperture in the wafer 32 directly into the lower fluid chamber 26.

The capacity between the two bodies of fluid, one on the inside of the tube and one on the outside of the tube, is inversely proportional to the distance between the inner electrolyte-contacting surface 40 and the outer electrolyte-contacting surface 42, but it is also directly proportional to the dielectric constant of the materials between these surfaces. The layer of air or gas in the chamber 38 therefore decreases the capacity between surfaces 40 and 42 three to four times the effect of the same thickness of glass.

The initial steps of forming a Coulter aperture tube may be used in fabricating a tube 10. After fully forming the conventional tube, but before installing the wafer, a bulge is blown on the side of the lower tubular body portion 22. A simple test tube of about the same diameter as the upper tubular portion 18 is cut to a length which will provide a space at the bottom end 36 as well as surrounding the lower tubular portion 22. An opening is formed in the side wall at 44 to provide exhaust for entrapped air during fabrication, and the upper end of the envelope 34 is carefully sealed by glass-blowing and welding techniques around the neck 24.

The bulge 30 is then sealed to the outer envelope to provide a single wall thickness which will be flattened and perforated so that the wafer 32 may be attached. The opening 44 is closed by heat when the tube has cooled, entrapping a quantity of air in the chamber 38. The thus formed aperture tube 10 thereby has the second or outer tubular wall, defined by the envelope 34, closed at its bottom end 36 and carrying the aperture means 32 as shown in FIGS. 1 through 12.

Figures 11, 12, 13:
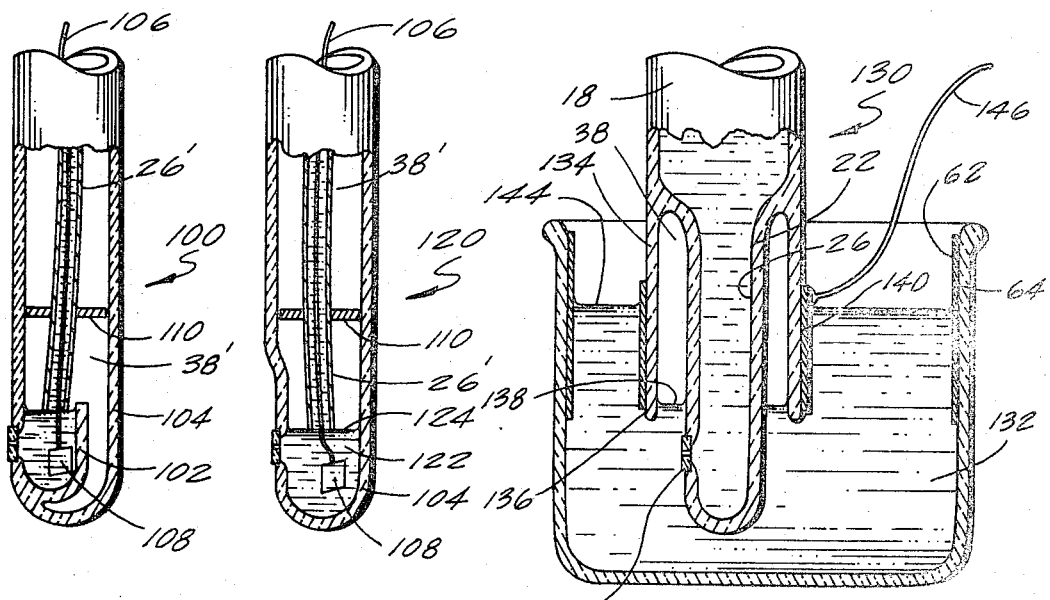
FIGS. 11 and 12 are fragmentary median sectional views of two forms of the invention which utilize structures somewhat different than those which have previously been illustrated, having internal tubing for the containing and conveyance of liquid.
FIG. 13 is a sectional view through an arrangement of an aperture tube, only the bottom portion of which is shown, immersed in a beaker of suspension, for extending the benefits of the invention to the capacitive effect of the beaker on the remainder of the particle analyzing apparatus.

The aperture tube 10 is connected with the manometer-syphon arrangement described and immersed in a vessel containing a suspension of particles in electrolyte, an example of such vessel being the beaker shown in FIG. 13. The level of liquid in most cases will come up not much higher than the height of the chamber 38, and in a great many cases, the benefits will attach even if the level is lowered substantially. As mentioned, however, it will be seen that when the level of the liquid on the outside of the tube drops, as for example by a long run or series of runs without replenishing the body of suspension, the coupling between the bodies of liquid inside and outside of the aperture tube will change. The liquid in the tube 10 always fills the tube since it is a part of a closed liquid system, while that engaging the outer surface 42 drops in level.

This change in shunt capacitance could be troublesome in some instances, especially where the aperture current is A.C. of relatively high frequency. In such cases, the tuning of the aperture changes. It is feasible to tune the capacitance of the aperture by using an inductive reactance (not shown) so that its impedance is predominantly resistive. If the capacitance changes either way, the tuning changes, upsetting circuit adjustments and changing response characteristics.

The solution to this problem is in a conductive guard electrode about the layer of low dielectric constant, maintained at a constant potential. The word "guard" is used instead of "shield," since shielding normally is associated with grounded structures, while the electrodes used in keeping the capacitance constant are normally at some potential above ground, that is, a potential the same as that of the outer electrode immersed in the beaker liquid.

In FIG. 4 there is illustrated a tube whose construction differs very little from that of the tube 10 of FIG. 1 except in the presence of the guard electrode. Accordingly, the reference numerals for the same or equivalent parts are the same, as in other figures.

There is a cylindrical metal member 52 illustrated in FIG. 6, which is inserted into the chamber 38 and is firmly pressed against the inner surface of the outer envelope 34 spaced from the inner lower tubular portion 22. An electrical lead 52' is soldered to the electrode at 54 and led through the opening 44 before sealing the same. Preferably the cylindrical electrode 52 is made of resilient metal such as Phosphor bronze having a normal diameter greater than that shown in FIGS. 4, 5 and 6. The overlapped engagement 56 helps the electrode retain its shape when frictionally engaged on the interior of the chamber 38.

The electrical lead 52' is connected to the normal immersion electrode 53, shown generally in FIG. 4 which is immersed in the outer vessel, and this in turn is connected through a lead such as 55 to the source of aperture current and detector, remaining at the same potential as that of the outer electrode, irrespective of the level of the liquid in the outer vessel. This level may vary between the upper and lower edges 58 and 60 without effect. This means that the apparent depth to which the aperture tube 50 is immersed is determined by the top 52 of the guard electrode.

This same technique may be used for maintaining the shunt capacitance between the body of liquid in the outer vessel and the remainder of the apparatus independent of fluid level in the beaker by also installing a guard electrode 62 on the interior or exterior of the beaker 64 as shown in FIG. 13, which will be described. If on the exterior, connection is made to the body of liquid in the beaker.

Instead of a sheet metal cylinder like 52, the electrode on the interior of the envelope 34 may be formed of a deposit of metal applied before sealing the same to the body portion 18. Any other coating or covering may be used and the lead 52 electrically connected thereto.

Figures 7, 8:
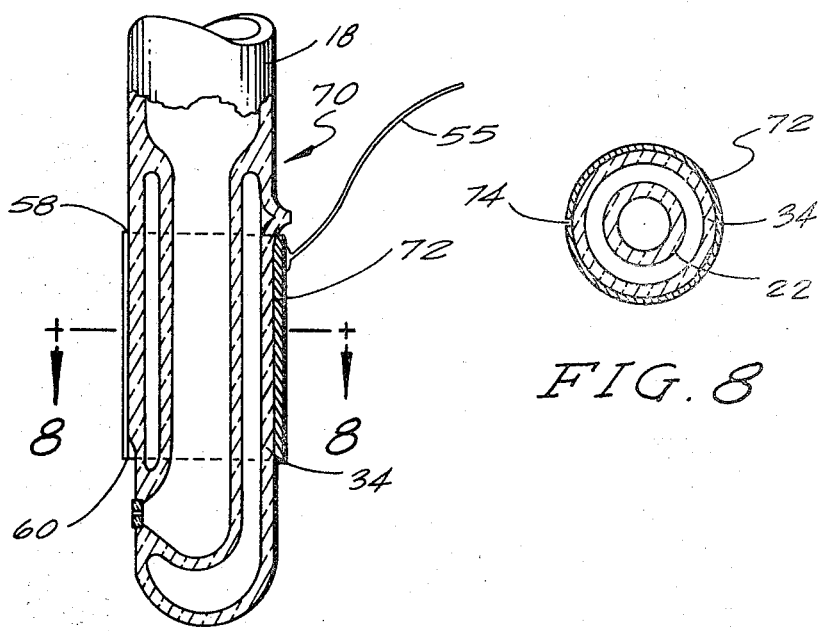
FIG. 7 is a sectional view similar to that of FIG. 4 but of still another form of the invention providing for constant shunt capacitance.
FIG. 8 is a transverse sectional view along the line 8—8 of FIG. 7 and in the indicated direction.

The structure of FIG. 7 is a modified form. The tube here is designated 70 and has the guard electrode 72 positioned on the exterior of the tube. Obviously, if made in the same manner as the electrode 52, this cylindrical configuration should be constructed to tend to curl into a smaller diameter, so that it can be stretched open and clamped over the tube. It has the advantage that no leads need be connected to it since it is adready in contact with the electrolyte on the exterior of the tube, but it has the disadvantage that it may corrode unless made out of some noble, and hence expensive, metal like platinum. If used in this manner, the electrical lead 55 from the detector and current source may be connected directly to it, eliminating the normal immersion electrode 53 from the beaker. The overlap 56 is not needed, but some form might be best to keep the space 74 at a minimum or even to eliminate the same.

Figures 9, 10:
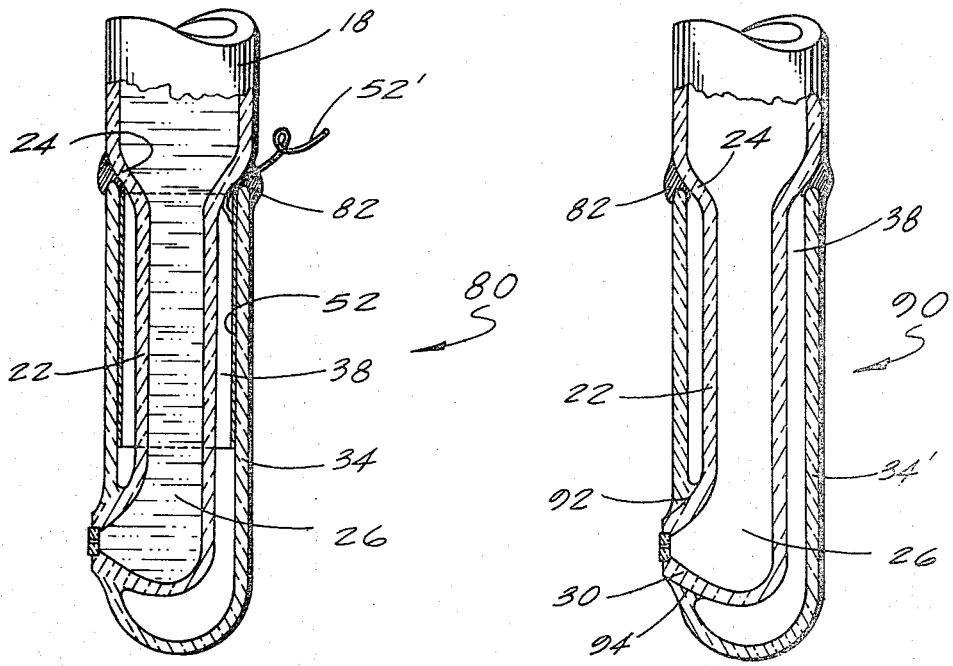
FIG. 9 is a sectional view similar to that of FIG. 4 but of a further modified form of the invention providing for constant shunt capacitance.
FIG. 10 is a sectional view similar to that of FIG. 4 but of a further modified form of the invention providing for constant shunt capacitance.

FIGS. 9 and 10 illustrate two forms of the invention, designated 80 and 90. They have the common structural feature that during the fabrication, the upper ends of the outer envelopes 34 and 34' are left free of the body 18. This enables the glass of the envelopes to be substantially different from the glass of the inner lower tubes 22, without being concerned over co-efficients of thermal expansion. Without sealing by fusion, the resulting space between the upper ends of the envelopes 34, 34′ and the tapered portions 24 can be closed off by any sutiable material that is impervious to the liquid of the suspension, as shown at 82. The material may be pitch, adhesives such as epoxy resins, or even rubber O-rings. The electrical lead 52′ connected to the interior cylindrical electrode 52 is easily taken through the layer of sealing material. The seals will prevent entrance of liquids to and contamination of the chambers 38. An inner fluid body is shown in the field carrying portion of the aperture tube, by way of illustration.

The structure 90 of FIG. 10 uses an outer envelope 34′ which is formed of conducting glass, thereby providing the two mentioned benefits of the invention without the need for a specifically applied guard electrode. The only caution to be observed is to assure that the bulge 30 remains inviolate when the envelope 34′ is sealed thereto at 92 and 94 so that none of the conductive glass contacts the liquid in the lower fluid chamber 26.

The aperture tube 100 in FIG. 11 has means defining a well in the form of a small cup-shaped receptacle 102 fused into the lower interior of the body 104, the receptacle being open a the top. The lower fluid chamber 26′ is the substantial equivalent of the chamber 26, previously referred to. In this case, it is in the form of an economical flexible polyethylene tube or pipe commercially available, having the lead 106 connected through it to the electrode 108 in the cup. Suction is applied to the pipe 26′, and until the cup fills, air is withdrawn, lowering the pressure in the chamber 38′. The upper end of the tube 104 is closed, with the inner pipe 26′ sealed thereto and passing through to the remainder of the closed liquid system (not shown). A spacer 110 centers the pipe 26′. When the cup fills, the liquid is continuously withdrawn from it by way of the pipe 26′ the chamber 38′ remaining at low pressure.

The reduction of shunting capacitance is again accomplished in this case by the space between the pipe 26′ and the body 104. This space also surrounds most of the cup 102. A guard electrode may also be used if it is desired to keep the shunt capacitance constant.

The aperture tube 120 differs from the tube 100 only in the absence of the cup 102, the means defining a well, being, in fact here, the bottom of the tube. The reduction of capacitance is not as much since the liquid 122 in the bottom of the tube is immediately against the wall 104 of the tube, and the only capacitance reduction takes place above the level 124 of the liquid 122.

In both of FIGS. 11 and 12, it will be appreciated that the "body" of liquid inside the aperture tube is in effect formed of two parts, that in the cup 102 and at 122 and that which is contained within the pipes 26′. The inner fluid carrying chamber in these figures comprises the pipe 26′ and cup 102 in one instance, and the pipe 26′ alone in the other.

In FIG. 13 there is illustrated an aperture tube 130 immersed in a body of liquid 132 within the beaker 64. The tube 130 has the normal interior construction, providing the body 18, the inner lower portion 22, having the lower chamber 26 and the wafer 32. In this case, there is an open ended imperforate skirt 134 of glass or the like surrounding the lower portion 22. Its lower edge 136 is somewhat above the level of the aperture wafer 32. When carefully presented by an axial movement into the body of liquid 132, the tube 130 will entrap a volume of air in the chamber 38 surrounding the portion 22, and this provides the benefits of lowered capacitance above the level 138. The guard electrode 140 in this case surrounds the skirt 134 and is in direct contact with the liquid 132. The use of the electrode 62 is to decrease the shunt capacitance between body of liquid 132 and the other parts of the particle studying apparatus (not shown) and keep the same constant regardless of the level 144. The electrical lead 146 to the detector may be connected to the guard electrode 140 or to the electrode 62 or both. If the beaker 62 is on the exterior of the beaker, as in the case where the body of liquid 132 includes corrosive fluids, an electrical connection will have to extend to the body of liquid 132. This is easily done by a connection to lead 146.

Reference may be made to the diagrammatic flow representation illustrated in FIG. 14 in following the method provided by the invention to form the aperture tube such as illustrated in FIGS. 1–10 of the drawings. The steps followed are as follows:

Forming a first tubular glass member having upper and lower portions, the lower portion being of smaller diameter than the upper portion and connected thereto by a neck, the upper end being open and the bottom end closed; forming a second tubular glass member of inside diameter larger than that of the lower portion; perforating the second tubular glass member to form an exhaust port, the upper end of the second tubular member being open; forming a lateral bulge in the lower portion; sealing the upper end of the second tubular member to the first tubular member at said neck so that the lower portion is enclosed and concentric walls of glass and a sandwiched layer of air are thereby defined; sealing that portion of the second tubular member aligned with the bulge to the bulge to form a single junction; perforating said junction and flattening said junction about the perforation; installing a pierced wafer in the surface over said perforation and closing said exhaust port.

In order to provide the guard electrode construction, the following steps are illustrated:

Prior to sealing the upper end of the second tubular member at said neck, the additional steps of applying an electrode to the interior surface of said second tubular member with an electrical lead connected thereto, and bringing out the lead from the interior of said second tubular member at said neck so that sealing the second tubular member fixes said lead thereat, the electrode being formed as a cylindrical member of resilient metal having an open axially extending seam and a diameter prior to insertion into said second tubular member substantially larger than the diameter of the interior of said second tubular member; rolling the cylindrical member into a formation of a diameter smaller than the said diameter of the interior of said second tubular member; inserting said rolled cylindrical member into the second tubular member, and thereafter permitting free expansion thereof into frictional engagement with the wall of said second tubular member.

What it is desired to secure by Letters Patent of the United States is:

1. In an aperture tube for use as the part of an electronic particle study apparatus which is immersed in a first body of liquid electrolyte while containing a second body of liquid electrolyte, and which includes a generally tubular first wall defining a carrying chamber for the second body of liquid electrolyte and carrying aperture means for establishing sole electrical and fluid communication paths between said liquid electrolyte bodies; the improvement comprising, said aperture tube having a second tubular wall having a closed bottom and being spaced from the first wall but sealed thereto to define an intermediate chamber between the carrying chamber and the exterior of the aperture tube, said aperture means being formed in said second tubular wall, and means for materially decreasing shunt capacitance paths between the bodies of liquid electrolyte on immersion of said tube thereinto, said means comprising a layer of low-dielectric constant disposed within said intermediate chamber and intermediate the first and second bodies of liquid electrolyte on immersion of the tube into said first liquid electrolyte body, said intermediate chamber and layer encircling the carrying chamber for the second body of liquid electrolyte but communicatively isolated, physically therefrom.

2. The aperture tube as claimed in claim 1 and means maintaining the shunt capacitance between said liquid electrolyte bodies independent of relative level changes in the level of said bodies, said means comprising a guard electrode isolated from the second body of liquid electrolyte and substantially encircling said layer of low-dielectric constant along a substantial portion thereof spaced from the aperture means and means to establish electrical connection between said guard electrode and the first body of liquid electrolyte, said electrical connection means maintaining the electrical potential of said guard electrode at the same potential level as that of said first body of liquid electrolyte.

3. The aperture tube as claimed in claim 2 wherein the guard electrode is disposed in engagement with said layer.

4. The aperture tube as claimed in claim 1 in which said layer of low-dielectric constant is constituted by the area within said chamber.

5. The aperture tube as claimed in claim 2 in which said layer of low-dielectric constant is constituted by the area within said chamber.

6. The aperture tube as claimed in claim 4 wherein said tubular walls merge to a single thickness portion immediately surrounding said aperture.

7. The aperture tube as claimed in claim 5 wherein said tubular walls merge to a single thickness portion immediately surrounding said aperture.

8. The aperture tube as claimed in claim 2 wherein said second tubular wall is formed of vitreous conducting material, said second wall itself constituting the guard electrode.

9. An aperture tube for use as the part of an electronic particle study apparatus which is immersed in a first body of liquid electrolyte while containing a second body of liquid electrolyte and which aperture tube includes carrying chamber means for the second body of liquid electrolyte and fluid passage means, including aperture means, for establishing sole electrical and fluid communication between said carrying chamber means and said first body of liquid electrolyte, a layer of low-dielectric constant surrounding the carrying chamber means and communicatively isolated from same and the fluid passage means, said carrying chamber means comprising an interior tube having a first tubular wall and a second tubular wall having a closed bottom end and arranged substantially encircling the first tubular wall spaced therefrom and sealed thereto to define said layer therebetween, said interior tube formed as a pipe having a lower end spaced above the bottom end of the second tubular wall, means defining a well at the closed bottom end of the second tubular wall, said fluid passage means, including the aperture means, being formed in said second tubular wall with the pipe constructed and arranged to dip into liquid electrolyte in the well at the closed bottom end of said second tubular wall, said carrying chamber means including the well at said closed bottom end of said second tubular wall.

10. The aperture tube as claimed in claim 9 in which there is a guard electrode isolated from the second body of liquid electrolyte and substantially encircling said layer of low-dielectric constant along a substantial portion thereof spaced from the aperture means and electrical connection means maintaining the electrical potential of said guard electrode at the same potential level as that of said first liquid body of electrolyte.

11. In an aperture tube for use as the part of an electronic particle study apparatus which is immersed in a first body of liquid electrolyte while containing a second body of liquid electrolyte, and which includes a generally tubular first wall defining a carrying chamber for the second body of liquid electrolyte and carrying aperture means for establishing sole electrical and fluid communication paths between said liquid electrolyte bodies; the improvement comprising, said aperture tube having a second tubular wall spaced from the first wall but sealed thereto to define an intermediate chamber between the carrying chamber and the exterior of the aperture tube, and means for materially decreasing shunt capacitance paths between the bodies of liquid electrolyte on immersion of said tube thereinto, said means comprising a layer of low-dielectric constant disposed within said intermediate chamber and intermediate the first and second bodies of liquid electrolyte on immersion of the tube into said first liquid electrolyte body, said intermediate chamber and layer encircling the carrying chamber for the second body of liquid electrolyte but communicatively isolated, physically therefrom, said second tubular wall defining an imperforate skirt encircling said carrying chamber axially above the aperture means, the said layer including air captured between the said first and second tubular walls upon axial entry of the aperture tube into said first body of liquid electrolyte.

12. The aperture tube as claimed in claim 11 and means maintaining the shunt capacitance between said liquid electrolyte bodies independent of relative level changes in the level of said bodies, said means comprising a guard electrode isolated from the second body of liquid electrolyte and substantially encircling said layer of low-dielectric constant along a substantial portion thereof spaced from the aperture means and means to establish electrical connection between said guard electrode and the first body of liquid electrolyte, said electrical connection means maintaining the electrical potential of said guard electrode at the same potential level as that of said first body of liquid electrolyte.

13. A method of making a Coulter aperture tube which comprises the steps of: forming a first tubular glass member having upper and lower portions, the lower portion being of smaller diameter than the upper portion and connected thereto by a neck, the upper end being open and the bottom end closed; forming a second tubular glass member of inside diameter larger than that of the lower portion; perforating the second tubular glass member to form an exhaust port, the upper end of the second tubular member being open; forming a lateral bulge in the lower end of the lower portion; sealing the upper end of the second tubular member to the first tubular member at said neck so that the lower portion is enclosed and concentric walls of glass and a sandwiched layer of air are thereby defined; sealing that portion of the second tubular member aligned with the bulge to form a single junction; perforating said junction and flattening the junction about the perforation; installing a pierced wafer in the surface over said perforation and thereafter closing said exhaust port.

14. The method of making a Coulter aperture tube as claimed in claim 13, in which, prior to sealing the upper end of the second tubular member at said neck, the additional steps of applying an electrode to the interior surface of said second tubular member with an electrical lead connected thereto, and bringing out the lead from the interior of said second tubular member at said neck so that sealing the second tubular member fixes said lead thereat.

15. The method as claimed in claim 14 in which the electrode is formed as a cylindrical member of resilient metal having an open axially extending seam and a diameter prior to insertion into said second tubular member substantially larger than the diameter of the interior of said second tubular member; rolling the cylindrical member into a formation of a diameter smaller than the said diameter of the interior of said second tubular member;

inserting said rolled cylindrical member into the second tubular member, and thereafter permitting free expansion thereof into frictional engagement with the wall of said second tubular member.

References Cited

UNITED STATES PATENTS

| | | | | |
|---|---|---|---|---|
| 2,593,999 | 4/1952 | Eisler | | 65—153 |
| 3,195,994 | 7/1965 | Lindsay | | 65—153 |
| 3,165,693 | 1/1965 | Isreeli | | 324—71 |
| 3,299,354 | 1/1967 | Hogg | | 324—71 |
| 3,361,965 | 1/1968 | Coulter | | 324—71 |
| 3,395,343 | 7/1968 | Morgan | | 324—71 |

S. LEON BASHORE, Primary Examiner

E. R. FREEDMAN, Assistant Examiner

U.S. Cl. X.R.

65—34, 36, 42, 58, 153, 155